(12) United States Patent
Sullivan et al.

(10) Patent No.: US 6,692,380 B2
(45) Date of Patent: Feb. 17, 2004

(54) GOLF BALL WITH HIGH DENSITY CENTER

(75) Inventors: Michael J. Sullivan, Barrington, RI (US); Derek A. Ladd, Fairhaven, MA (US); Antonio U. Desimas, East Providence, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/352,705

(22) Filed: Jan. 28, 2003

(65) Prior Publication Data

US 2003/0144081 A1 Jul. 31, 2003

Related U.S. Application Data

(63) Continuation-in-part of application No. 10/157,679, filed on May 29, 2002, which is a continuation-in-part of application No. 09/842,574, filed on Apr. 26, 2001, now Pat. No. 6,533,682, which is a continuation-in-part of application No. 09/815,753, filed on Mar. 23, 2001, now Pat. No. 6,494,795.

(51) Int. Cl.[7] .................... A63B 37/04; A63B 37/06; A63B 37/00
(52) U.S. Cl. ........................ 473/376; 473/351
(58) Field of Search ................ 473/351–377

(56) References Cited

U.S. PATENT DOCUMENTS

| | | |
|---|---|---|
| 4,431,193 A | 2/1984 | Nesbitt |
| 4,625,964 A | 12/1986 | Yamada |
| 5,048,838 A | 9/1991 | Chikaraishi et al. |
| 5,104,126 A | 4/1992 | Gentiluomo |
| 5,184,828 A | 2/1993 | Kim et al. |
| 5,482,285 A | 1/1996 | Yabuki et al. |
| 5,703,166 A | 12/1997 | Rajagopalan et al. ....... 525/196 |
| 5,783,293 A | 7/1998 | Lammi .................. 428/212 |
| 5,810,678 A | 9/1998 | Cavallaro et al. ........... 473/373 |
| 5,823,889 A | 10/1998 | Aoyama ..................... 473/374 |
| 5,824,746 A | 10/1998 | Harris et al. ................. 525/196 |
| 5,885,172 A | 3/1999 | Hebert et al. ............... 473/354 |
| 5,919,100 A | 7/1999 | Boehm et al. ............... 473/354 |
| 5,947,843 A | 9/1999 | Calabria et al. ............. 473/377 |
| 5,981,658 A | 11/1999 | Rajagopalan et al. ......... 525/72 |
| 5,989,136 A | 11/1999 | Renard et al. .............. 473/376 |
| 5,993,968 A | 11/1999 | Umezawa et al. .......... 428/407 |
| 6,010,411 A | 1/2000 | Reyes ........................ 473/345 |
| 6,025,442 A | 2/2000 | Harris et al. ................. 525/221 |
| 6,030,296 A | 2/2000 | Morgan et al. .............. 473/361 |
| 6,068,561 A | 5/2000 | Renard et al. .............. 473/364 |
| 6,071,201 A | 6/2000 | Maruko ..................... 473/373 |
| 6,102,815 A | 8/2000 | Sutherland .................. 473/372 |
| 6,120,393 A | 9/2000 | Sullivan et al. ............. 473/377 |
| 6,142,887 A | 11/2000 | Sullivan et al. ............. 473/374 |
| 6,149,535 A | 11/2000 | Bissonnette et al. ......... 473/354 |
| 6,152,834 A | 11/2000 | Sullivan .................... 473/365 |
| 6,254,495 B1 * | 7/2001 | Nakamura et al. .......... 473/371 |

(List continued on next page.)

FOREIGN PATENT DOCUMENTS

| | | |
|---|---|---|
| WO | WO 00/23519 | 4/2000 |
| WO | WO 00/57962 | 10/2000 |

OTHER PUBLICATIONS

Spalding Press Release Mar. 27, 2002.

*Primary Examiner*—Mark S. Graham
*Assistant Examiner*—Alvin A. Hunter, Jr.

(57) ABSTRACT

A high CoR golf ball having predetermined moment of inertia is provided. A portion of the golf ball preferably contains substantially no filler, which contributes to the increased resilience of the ball. In accordance to one aspect of the invention, the portion with substantially no filler is an outer core of the ball. The innermost core should have a high specific gravity. Additionally, the outermost layers of the ball may have a low specific gravity. Preferably, the portion with substantially no filler is relatively larger than other portions of the ball.

29 Claims, 1 Drawing Sheet

U.S. PATENT DOCUMENTS

| | | | |
|---|---|---|---|
| 6,271,296 B1 * | 8/2001 | Nakamura et al. | 524/423 |
| 6,277,034 B1 | 8/2001 | Nesbitt et al. | 473/372 |
| 6,290,612 B1 * | 9/2001 | Maruko et al. | 473/376 |
| 6,361,453 B1 * | 3/2002 | Nakamura et al. | 473/371 |
| 6,394,912 B1 * | 5/2002 | Nakamura et al. | 473/371 |
| 6,431,998 B1 * | 8/2002 | Nakamura et al. | 473/371 |
| 6,431,999 B1 * | 8/2002 | Nesbitt | 473/372 |
| 6,458,047 B1 * | 10/2002 | Nesbitt | 473/372 |
| 6,461,251 B1 * | 10/2002 | Yamagishi et al. | 473/376 |
| 2001/0016524 A1 | 8/2001 | Sullivan et al. | 473/378 |
| 2001/0019969 A1 | 9/2001 | Binette et al. | 473/354 |
| 2001/0019972 A1 | 9/2001 | Nesbitt et al. | 473/372 |
| 2001/0021676 A1 | 9/2001 | Sullivan et al. | 473/371 |
| 2001/0024979 A1 | 9/2001 | Nesbitt et al. | 473/370 |
| 2001/0024980 A1 | 9/2001 | Nesbitt et al. | 473/372 |
| 2001/0024982 A1 | 9/2001 | Cavallaro et al. | 473/377 |
| 2001/0031668 A1 | 10/2001 | Sullivan et al. | 473/351 |
| 2002/0013183 A1 | 1/2002 | Sullivan et al. | 473/371 |
| 2002/0013185 A1 | 1/2002 | Sullivan et al. | 473/373 |
| 2002/0034989 A1 | 3/2002 | Sullivan et al. | 473/373 |
| 2002/0045495 A1 | 4/2002 | Nesbitt et al. | 473/370 |

* cited by examiner

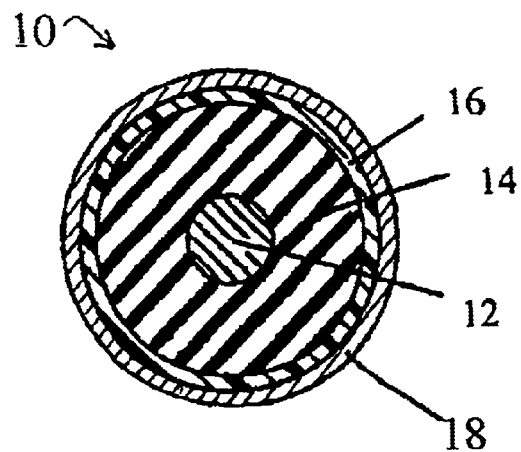
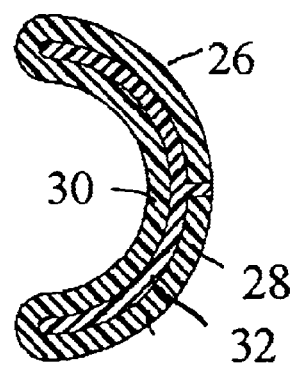
FIG. 1      FIG. 3
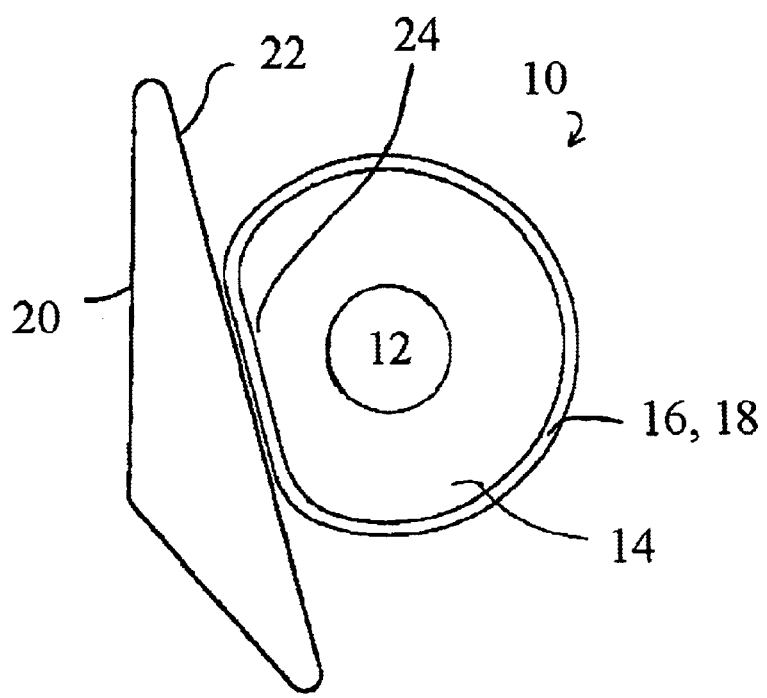
FIG. 2

GOLF BALL WITH HIGH DENSITY CENTER

CROSS-REFERENCE TO RELATED APPLICATIONS

This application is a continuation-in-part of co-pending patent application entitled "Golf Ball," bearing application Ser. No. 10/157,679, filed on May 29, 2002, which is a continuation-in-part of application Ser. No. 09/842,574, now U.S. Pat. No. 6,533,682, filed on Apr. 26, 2001, which is a continuation-in-part of application Ser. No. 09/815,753, now U.S. Pat. No. 6,494,795 entitled "Golf Ball and Method for Controlling the Spin Rate of Same," filed on Mar. 23, 2001.

FIELD OF THE INVENTION

The present invention relates to golf balls and more particularly, the invention is directed to golf balls with increased resilience and high density center.

BACKGROUND OF THE INVENTION

The spin rate of golf balls is the end result of many variables, one of which is the distribution of the density or specific gravity within the ball. Spin rate is an important characteristic of golf balls for both skilled and recreational golfers. High spin rate allows the more skilled players, such as PGA professionals and low handicapped players, to maximize control of the golf ball. A high spin rate golf ball is advantageous for an approach shot to the green. The ability to produce and control back spin to stop the ball on the green and side spin to draw or fade the ball substantially improves a player's control over the ball. Hence, the more skilled players generally prefer a golf ball that exhibits high spin rate, in part, off scoring irons, such as the 7-iron club through the pitching wedge.

On the other hand, the recreational players who cannot intentionally control the spin of the ball generally do not prefer a high spin rate golf ball. For these players, slicing and hooking the ball are the more immediate obstacles. When a club head strikes a ball improperly, an unintentional side spin is often imparted to the ball, which sends the ball off its intended course. The side spin reduces a player's control over the ball, as well as the direct-line distance the ball will travel. A golf ball that spins less tends not to drift off-line erratically if the ball is not hit squarely with the club face. A low spin ball will not cure the hook or slice, but will reduce the adverse effects of the side spin. Hence, recreational players typically prefer a golf ball that exhibits low spin rate.

Reallocating the density or specific gravity of the various layers of a golf ball provides an important means of controlling the spin rate. In some instances, the weight from the outer portions of the ball is redistributed toward the center to decrease the moment of inertia, thereby increasing the spin rate. For example, U.S. Pat. No. 4,625,964 discloses a golf ball with a reduced moment of inertia having a core with specific gravity of at least 1.50 and a diameter of less than 32 mm and an intermediate layer of lower specific gravity between the core and the cover. U.S. Pat. No. 5,104,126 discloses a ball with a dense inner core having a specific gravity of at least 1.25 encapsulated by a lower density syntactic foam composition. U.S. Pat. No. 5,048,838 discloses another golf ball with a dense inner core having a diameter in the range of 15–25 mm with a specific gravity of 1.2 to 4.0 and an outer layer with a specific gravity of 0.1 to 3.0 less than the specific gravity of the inner core. U.S. Pat. No. 5,482,285 discloses another golf ball with reduced moment of inertia by reducing the specific gravity of an outer core to 0.2 to 1.0.

In other instances, the weight from the inner portion of the ball is redistributed outward to increase the moment of inertia, thereby decreasing the spin rate. U.S. Pat. No. 6,120,393 discloses a golf ball with a hollow inner layer with one or more resilient outer layers, thereby giving the ball a soft core, and a hard cover. U.S. Pat. No. 6,142,887 discloses an increased moment of inertia golf ball comprising one or more layer layers made from metals, ceramic or composite materials, and a polymeric spherical substrate disposed inwardly from the layer layers.

These and other references disclose specific examples of high and low spin rate ball with ranges of specific gravity, ranges of diameter for the core and ranges of thickness for the outer layers, etc. They, however, do not offer a high spin rate golf ball with a high density inner core and a resilient outer core wherein both the spin rate and resilience are maximized by controlling both the specific gravity and diameter of the inner core and the composition and diameter of the outer core. Hence, there remains a need in the art for an improved golf ball with controlled spin rates.

SUMMARY OF THE INVENTION

The present invention is directed to a golf ball with an inner core of a predetermined specific gravity and diameter.

The present invention is further directed to a golf ball with multi-layer core, wherein the outer core layer contains substantially no filler, or in other words it contains filler in an amount that is less than or equal to five parts of filler to 100 parts of polymeric material.

In one embodiment, the present invention encompasses a golf ball comprising a core having an inner core and an outer core and which is encased by a cover having a thickness from about 0.010 inch to about 0.080 inch, wherein the inner core has a specific gravity of at least about 3 and a diameter of about 0.40 inch to about 0.60 inch.

In another embodiment, the present invention encompasses a golf ball wherein the specific gravity of the inner core is from about 3 to about 4 and comprises a polymeric matrix comprising polyurethane, polyurea, or a combination thereof. In one embodiment, the inner core polymeric matrix is substantially free of polybutadiene.

In yet another embodiment of the present invention, the inner core comprises high specific gravity filler incorporated in a polymeric matrix, preferably tungsten powder. Additionally, the high specific gravity filler may be selected from a group consisting of metal powder, metal alloy powder, metal oxide, metal stearates particulates and carbonaceous materials. Also, the high specific gravity filler may be selected from a group consisting of bismuth powder, boron powder, brass powder, bronze powder, cobalt powder, copper powder, inconel metal powder, iron metal powder, molybdenum powder, nickel powder, stainless steel powder, titanium metal powder, zirconium oxide powder, aluminum flakes, tungsten metal powder, beryllium metal powder, zinc metal powder, tin metal powder, zinc oxide, iron oxide, aluminum oxide, titanium dioxide, magnesium oxide, zirconium oxide and tungsten trioxide.

In another embodiment, the diameter of the inner core is from about 0.45 inch to about 0.55 inch, more preferably about 0.5 inch. Also, preferably the inner core comprises polyurethane.

In another embodiment, the outer core has a specific gravity of about 1.0 to about 1.1. The outer core preferably comprises a polymeric material substantially free of fillers. If present, the amount of fillers within the polymeric matrix of the outer core is less than about 3 phr to 100 phr of polymeric outer core material.

In one embodiment of the present invention, the golf ball's outer core is made of a polymeric matrix selected from a group consisting of natural rubber, polybutadiene, polyisoprene, styrene-butadiene or styrene-propylene-diene rubber, ionomer resins, polyamides, polyesters, thermoplastic elastomer, polyether amide copolymers, polyether ester copolymers, thermoplastic urethane, styrenic block copolymers elastomers, metal salt of a fatty acid, partially or fully neutralized ionomer, metallocene or other catalyzed polymer, castable material, urethane, polyurea, epoxy, silicone, interpenetrating polymer networks, and a melt processible composition, which comprises a highly neutralized ethylene copolymer and one or more aliphatic, monofunctional organic acids having fewer than 36 carbon atoms of salts thereof, wherein greater than 90% of all the acid of the ethylene copolymer is neutralized. Optionally, the outer core further comprises at least one sulfur compound.

When the outer core comprises polybutadiene, preferably the butadiene has a Mooney viscosity from about 40 to about 80. More preferably, the butadiene has a Mooney viscosity is from about 40 to about 60. In yet another embodiment, the outer core has a specific gravity in the range of about 1.0 to about 1.1. Preferably, the outer core is made of polybutadiene and has a specific gravity of about 1.06.

In yet another embodiment, the golf ball has a cover, wherein the cover thickness is about 0.01 inch to 0.08 inch. The cover may be in the form of a sandwich cover and wherein the sandwich cover comprises an inner cover layer and outer cover layer comprising a first polymeric material and an intermediate cover layer comprising a second polymeric material. In an alternative embodiment, the cover comprises an inner cover layer and an outer cover layer. The inner cover may comprise an ionomer having a Shore D hardness of greater than about 60, preferably having Shore D hardness from about 60 to about 80, and more preferably, Shore D hardness from about 69 to about 74.

In an embodiment, the golf ball of the present invention has an outer cover comprising a urethane having a Shore D hardness of less than about 65. Preferably, the urethane has a Shore D hardness of about 30 to about 60. The cover may comprises a material selected from a group consisting of polyurethane, partially or fully neutralized ionomer, polyurea, polyurethane ionomer, metallocene or other catalyzed polymer, silicone, metal salt of a fatty acid and melt processible composition, which comprises a highly neutralized ethylene copolymer and one or more aliphatic, monofunctional organic acids having fewer than 36 carbon atoms of salts thereof, wherein greater than 90% of all the acid of the ethylene copolymer is neutralized.

BRIEF DESCRIPTION OF THE DRAWINGS

In the accompanying drawings, which form a part of the specification and are to be read in conjunction therewith and in which like reference numerals are used to indicate like parts in the various views:

FIG. 1 is a cross-sectional view of a golf ball in accordance to the present invention;

FIG. 2 is a plane view of an impact caused by a club striking a golf club; and

FIG. 3 is a cross-sectional view of a sandwich cover suitable for use with the present invention.

DETAILED DESCRIPTION OF THE INVENTION

It is well known that the total weight of the ball has to conform to the weight limit set by the United States Golf Association ("USGA"). Redistributing the weight or mass of the ball either toward the center of the ball or toward the outer surface of the ball changes the dynamic characteristics of the ball at impact and in flight. Specifically, if the density is shifted or redistributed toward the center of the ball, the moment of inertia is reduced, and the initial spin rate of the ball as it leaves the golf club would increase due to lower resistance from the ball's moment of inertia. Conversely, if the density is shifted or redistributed toward or within the outer cover, the moment of inertia is increased, and the initial spin rate of the ball as it leaves the golf club would decrease due to the higher resistance from the ball's moment of inertia. The radial distance from the center of the ball or from the outer cover, where moment of inertia switches from being increased and to being decreased as a result of the redistribution of weight or mass density, is an important factor in golf ball design.

In accordance to one aspect of the present invention, this radial distance, hereinafter referred to as the centroid radius, is provided. When more of the ball's mass or weight is reallocated to the volume of the ball from the center to the centroid radius, the moment of inertia is decreased, thereby producing a high spin ball. When more of the ball's mass or weight is reallocated to the volume between the centroid radius and the outer cover, the moment of inertia is increased thereby producing a low spin ball.

The method for calculating centroid radius is fully disclosed in the two parent applications and the parent issued U.S. Pat. No. 6,494,795, whose disclosures have been incorporated by reference. The results show that the centroid radius is located at the same radial distance, i.e., at approximately 0.65 inch radially from the center of a ball weighing 1.62 ounce and with a diameter of 1.68 inches, or 0.19 inch radially from the surface of the ball.

Another advantageous result is that at a radial distance of less than about 0.25 inch, or more significantly less than about 0.20 inch, from the center of the ball the rate of the reduction in moment of inertia is considerably less than the rate of the reduction in moment of inertia from a radial distance from 0.25 inch to 0.65 inch. In other words, substantially all of the reduction in moment of inertia can be achieved by redistributing the weight of the ball to within an innermost core of about 0.40 inch to about 0.50 inch in diameter. Accordingly, the present invention encompasses golf balls having an inner core with a diameter of about 0.40 inches to about 0.60 inches, and preferably, an inner core with a diameter of about 0.45 inches to about 0.55 inches. Most preferably, the present invention is directed to a golf ball with an inner core diameter of about 0.50 inches.

To achieve a high spin golf ball, the inner core typically has a high specific gravity. The inner core is preferably a small highly filled thermoplastic or thermoset material with a specific gravity in the range described below. Preferably, the inner core has a specific gravity of about 3 to about 4, more preferably, the inner core has a specific gravity of about 3.2 to about 3.8. Most preferably, the inner core has a specific gravity of 3.6. Preferred materials for the inner core are polyurethane, polyurea, and combinations thereof. Fillers may be used, as known in the art, to obtain a high density inner core with a specific gravity within the range described herein. Additionally, the inner core may have a flexural modulus greater than about 50 kpsi, and preferably, a flexural modulus greater than about 55 kpsi.

In accordance to another aspect of the present invention, the golf ball 10 comprises a multi-layer core, as illustrated in FIG. 1, having at least an inner core 12 and an outer core layer 14. The multi-layer core is encased in a cover layer, which preferably is a multi-layer cover comprising at least inner cover layer 16 and outer cover layer 18. When necessary, a preferred way to redistribute the weight of the golf ball is by adding fillers to a selected portion of the golf ball to achieve a desirable moment of inertia. As used herein the term "fillers" include any compound or composition that can be used to vary the density or specific gravity of selected portions of the golf ball. Fillers include high density and low density fillers.

Suitable high density fillers may have specific gravity in the range from about 2 to about 19, and include, for example, metal (or metal alloy) powder, metal oxide, metal searates, particulates, carbonaceous materials, and the like or blends thereof. Examples of useful metal (or metal alloy) powders include, but are not limited to, bismuth powder, boron powder, brass powder, bronze powder, cobalt powder, copper powder, inconel metal powder, iron metal powder, molybdenum powder, nickel powder, stainless steel powder, titanium metal powder, zirconium oxide powder, aluminum flakes, tungsten metal powder, beryllium metal powder, zinc metal powder, or tin metal powder. Examples of metal oxides include but are not limited to zinc oxide, iron oxide, aluminum oxide, titanium dioxide, magnesium oxide, zirconium oxide, and tungsten trioxide. Examples of particulate carbonaceous materials include but are not limited to graphite and carbon black. Examples of other useful fillers include but are not limited to graphite fibers, precipitated hydrated silica, clay, talc, glass fibers, aramid fibers, mica, calcium metasilicate, barium sulfate, zinc sulfide, silicates, diatomaceous earth, calcium carbonate, magnesium carbonate, regrind (which is recycled uncured center material mixed and ground to 30 mesh particle size), manganese powder, and magnesium powder.

A more preferred high density filler is tungsten, tungsten oxide or tungsten metal powder due to its particularly high specific gravity of about 19.

Suitable low density fillers may include hollow spheres or microspheres that can be incorporated into a polymeric matrix of epoxy, urethane, polyester or any suitable binder, where the cured composition has a specific gravity of less than 0.9 or more preferably less than 0.8. Low density fillers in accordance to the present invention may also include air pockets that are present in foamed polymers, such as a polyurethane foam or an integrally skinned polyurethane foam that forms a solid skin of polyurethane over a foamed substrate of the same composition. Foamed polymers also include a nucleated reaction injection molded polyurethane or polyurea, where a gas, typically nitrogen, is essentially whipped into at least one component of the polyurethane, typically, the pre-polymer, prior to component injection into a closed mold where full reaction takes place resulting in a cured polymer having a reduced specific gravity. Foamed polymers also include chemically or physically foamed thermoplastic or thermosetting polymers.

One drawback of using fillers in the golf ball is that the fillers reduce the resilience and the coefficient of restitution (CoR) of the golf ball, and more particularly the CoR of the core or layers where the fillers are added. The CoR in solid core golf balls is a function of the composition of the molded core and of the cover. As discussed above, the molded core and the cover may comprise one or more layers. The CoR is related to the initial velocity of the ball, which must not exceed 250±5 ft/s, which the maximum limit set forth by the USGA. Hence, the CoR of golf balls are maximized and controlled, so that the initial velocity of the ball does not exceed the USGA limit.

To maximize the resilience and CoR of the ball, the outer core in accordance to the present invention preferably has a deformation zone that is substantially free of fillers. In other words, this zone preferably has the highest possible content of polymeric core materials. As used herein, the term "substantially free of fillers" means that the filler content is no more than about 5 phr to a 100 phr of rubber either before or after the cross-linking or curing process. The upper limit of filler content accounts for the impurities inherent in the materials that make up the outer core composition and has no other function other than weight contribution. For example, for an outer core composition that contains zinc acrylate or zinc diacrylate, a small amount of zinc oxide is added to the composition as an activator. Zinc oxide also reacts with and neutralizes any free acrylic acid that may be present in the zinc acrylate or zinc diacrylate to form zinc acrylate or zinc diacrylate. The zinc acrylate or zinc diacrylate is believed to become a part of the polymeric structure after the cross-linking process. The un-reacted zinc oxide remains in the outer core and acts as a high density filler. Another common impurity acting as a filler within the outer core material includes a halogenated cis-to-trans catalyst. Hence, outer core deformation zones that have less than about 5 phr filler to a 100 phr of rubber are within the scope of the present invention. More preferably, the outer core deformation zones have less than about 3 phr of filler to a 100 phr rubber. Most preferably, the outer core deformation zones have less than about 2.3 phr of filler to 100 phr rubber.

Preferably, the outer core of the present invention has a specific gravity from about 1 to about 1.15, and more preferably the specific gravity is from about 1.05 to about 1.10. Most preferably, the specific gravity of the outer core is about 1.06. Preferably, the diameter of the outer core is from about 1.45 inch to about 1.62 inch, and preferably, the diameter of the outer core is from about 1.55 inch to about 1.60 inch. Most preferably, the diameter of the outer core is about 1.58 inch.

Referring to FIG. 1, outer core 14 of a low moment of inertia ball is the core deformation zone and is substantially free of fillers. Preferably, outer core 14 occupies as large a volume of the golf ball as possible. Hence, the inner core 12 preferably has a high specific gravity. Additionally, the inner core may contain a high content of high specific gravity fillers to ensure that ball 10 adheres to the 1.62 ounce USGA limit. As illustrated in FIG. 2, when club head 20 strikes ball 10, a portion of ball 10 is deformed by the impact with face 22. The deformed portion 24 of outer core 14 is responsible for most of the rebounding of the golf ball core after impact. Hence, as long as the inner core 12 is remote from the deformed portion 24, there is no need to reduce further the size of inner core 12, and thereby unnecessarily increasing the specific gravity of the inner core. Typically, inner core 12 has a diameter of about 0.40 inch to about 0.60 inch, more preferably between about 0.45 inch and 0.55 inch, and most preferably about 0.50 inch.

It has been discovered that the CoR varies with the rate of deformation of the golf ball. More specifically, the CoR is higher at higher rates of deformation and higher rate of recovery than at lower rates. Hence, when more of the high resilient polymeric material is present in the deformed portion 24 of outer core layer 14, the deformed portion would recover faster. This faster rate of recovery increases the CoR of the core and thereby improving the CoR of the ball.

The compositions of outer core 14 described herein are suitable for a low moment of inertia ball, in accordance to one aspect of the present invention. In one example, such a dual core of the present invention has a 66 compression and a CoR of 0.781 wherein an outer core molded sphere has a 51 compression and a CoR of 0.813.

In another embodiment, the outer core 14 is made from a polybutadiene rubber (PBD) that has a mid Mooney viscosity range greater than about 40, more preferably in the range from about 40 to about 80 and more preferably in the range from about 40 to about 60 Mooney. Polybutadiene rubber with higher Mooney viscosity may also be used, so long as the viscosity of the PBD does not reach a level where the high viscosity PBD clogs or otherwise adversely interferes with the manufacturing machinery. It is contemplated that PBD with viscosity less than 65 Mooney can be used with the present invention. A "Mooney" unit is a unit used to measure the plasticity of raw or unvulcanized rubber. The plasticity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

Golf ball outer cores made with mid to high Mooney viscosity PBD material exhibit increased resiliency, hence distance, without increasing the hardness of the ball. Commercial sources of suitable mid to high Mooney PBD include Bayer AG. "CB 23", which has a Mooney viscosity of about 51 and is a highly linear polybutadiene, is a preferred PBD. If desired, the polybutadiene can also be mixed with other elastomers known in the art, such as natural rubber, styrene butadiene, and/or isoprene in order to further modify the properties of the outer core. When a mixture of elastomers is used, the amounts of other constituents in the outer core composition are typically based on 100 parts by weight of the total elastomer mixture.

Other suitable outer core materials including thermoset plastics, such as natural rubber, other grades of polybutadiene, polyisoprene, styrene-butadiene or styrene-propylene-diene rubber, and thermoplastics such as ionomer resins, polyamides, polyesters, or a thermoplastic elastomer. Suitable thermoplastic elastomers include Pebax®, which is believed to comprise polyether amide copolymers, Hytrel®, which is believed to comprise polyether ester copolymers, thermoplastic urethane, and Kraton®, which is believed to comprise styrenic block copolymers elastomers. These products are commercially available from Elf-Atochem, E.I. Du Pont de Nemours and Company, various manufacturers, and Shell Chemical Company, respectively. The outer core materials can also be formed from a metal salt of a fatty acid, any partially or fully neutralized ionomer, a metallocene or other catalyzed polymer and a castable material. Suitable castable materials include those comprising a urethane, polyurea, epoxy, silicone, interpenetrating polymer networks, etc. Golf ball outer cores made with these core materials has a PGA compression of preferably less than 90, more preferably less than 80 and most preferably less than 70.

Additionally, other suitable core materials (and cover materials) are disclosed in U.S. Pat. No. 5,919,100 and international publications WO 00/23519 and WO 01/29129. These disclosures are incorporated by reference herein in their entireties. One particularly suitable material disclosed in WO/29129 is a melt processible composition comprising a highly neutralized ethylene copolymer and one or more aliphatic, mono-functional organic acids having fewer than 36 carbon atoms of salts thereof, wherein greater than 90% of all the acid of the ethylene copolymer is neutralized.

In accordance to another aspect of the invention, the addition of sulfur compound to either the inner or outer core further increases the resiliency and the coefficient of restitution of the ball. Preferred sulfur compounds include, but are not limited to, pentachlorothiophenol (PCTP) and a salt of PCTP. A preferred salt of PCTP is ZnPCTP. The utilization of PCTP and ZnPCTP in golf ball cores to produce soft and fast cores is disclosed in co-pending U.S. application Ser. No. 09/951,963 filed on Sep. 13, 2001, and is assigned to the same assignee as the present invention. This co-pending application is incorporated by reference herein, in its entirety. A suitable PCTP is sold by the Structol Company under the tradename A95. ZnPCTP is commercially available from EchinaChem.

Metal salt diacrylates, dimethacrylates, and monomethacrylates suitable for use in this invention include those wherein the metal is magnesium, calcium, zinc, aluminum, sodium, lithium or nickel. Zinc diacrylate (ZDA) is preferred, but the present invention is not limited thereto. ZDA provides golf balls with a high initial velocity. The ZDA can be of various grades of purity. For the purposes of this invention, lower quantity of zinc stearate in the ZDA indicates higher ZDA purity. ZDA containing less than about 10% zinc stearate is preferable. More preferable is ZDA containing about 4–8% zinc stearate. Suitable, commercially available zinc diacrylates include those from Sartomer Co. The preferred concentrations of ZDA that can be used are about 25 pph to about 35 pph based upon 100 pph of polybutadiene or alternately, polybutadiene with a mixture of other elastomers that equal 100 pph. Advantageously, the PCTP organic sulfur reacts with the ZDA used in the core to further increase the initial velocity of golf balls.

Free radical initiators are used to promote cross-linking of the metal salt diacrylate, dimethacrylate, or monomethacrylate and the polybutadiene. Suitable free radical initiators for use in the invention include, but are not limited to peroxide compounds, such as dicumyl peroxide, 1,1-di(t-butylperoxy) 3,3,5-trimethyl cyclohexane, a—a bis(t-butylperoxy) diisopropylbenzene, 2,5-dimethyl-2,5di(t-butylperoxy) hexane, or di-t-butyl peroxide, and mixtures thereof. Other useful initiators would be readily apparent to one of ordinary skill in the art without any need for experimentation. The initiator(s) at about 70% to about 100% activity are preferably added in an amount ranging between about 0.05 pph and about 2.5 pph based upon 100 parts of butadiene, or butadiene mixed with one or more other elastomers. More preferably, the amount of initiator added ranges between about 0.15 pph and about 2 pph and most preferably between about 0.25 pph and about 1.5 pph. Suitable commercially available dicumyl peroxides include Perkadox BC, which is a 90% active dicumyl peroxide, and DCP 70, which is a 70% active dicumyl peroxide.

As discussed above, when ZDA or another metal salt of diacrylates, dimethacrylates, and monomethacrylates are used in either the inner or outer core, about 5 phr of zinc oxide or less (or a smaller amount of calcium oxide and higher amount of peroxide) is preferably added to the core composition to react and neutralize any acrylic acid that may be present.

Antioxidants may also be included. Antioxidants are compounds, which prevent the breakdown of the elastomer. Antioxidants useful in the present invention include, but are not limited to, quinoline type antioxidants, amine type antioxidants, and phenolic type antioxidants.

Other ingredients such as accelerators, e.g., tetra methylthiuram, processing aids, processing oils, dyes and pigments, as well as other additives well known to the skilled artisan may also be used in the present invention in amounts sufficient to achieve the purpose for which they are typically used.

In accordance to another aspect of the present invention, minimizing the thickness of the cover layers 16, 18, can also optimize the volume of the core deformation zone. Preferably, the thickness of cover layers 16, 18 ranges from about 0.010 inch to about 0.080 inch, and more preferably ranges from about 0.02 inch to about 0.06 inch. Most preferably, the thickness of the inner cover layer is about 0.4 inch and the thickness of the outer cover layer is about 0.6 inch. The thinness of the cover layers provides more volume, and thereby more resilient polymeric core materials can be included in the core layers. Preferred compositions and properties of the cover layers in accordance to the present invention are described below.

In another embodiment the inner and outer cover layers are disclosed in U.S. Pat. No. 5,885,172, which is incorporated herein by reference in its entirety. The outer cover layer 18 is preferably formed from a relatively soft thermoset material in order to replicate the soft feel and high spin play characteristics of a balata ball when the balls of the present invention are used for pitch and other "short game" shots. In particular, the outer cover layer should have a Shore D hardness of from less than about 65 or about 30 to about 60, preferably about 35 to about 50 and most preferably about 40 to about 45. Hardness is preferably measured pursuant to ASTM D-2240 in either button or slab form. Additionally, the materials of the outer cover layer must have a degree of abrasion resistance in order to be suitable for use as a golf ball cover.

The outer cover layer of the present invention can comprise any suitable thermoset material, which is formed from a castable reactive liquid material. The preferred materials for the outer cover layer include, but are not limited to, thermoset urethanes and polyurethanes, thermoset urethane ionomers and thermoset urethane epoxies. Examples of suitable polyurethane ionomers are disclosed in U.S. Pat. No. 5,692,974, the disclosure of which is hereby incorporated by reference herein in its entirety in the present application.

Thermoset polyurethanes and urethanes are particularly preferred for the outer cover layers of the balls of the present invention. Polyurethane is a product of a reaction between a polyurethane prepolymer and a curing agent. The polyurethane prepolymer is a product formed by a reaction between a polyol and a diisocyanate. The curing agent is typically either a diamine or glycol. Often a catalyst is employed to promote the reaction between the curing agent and the polyurethane prepolymer.

Conventionally, thermoset polyurethanes are prepared using a diisocyanate, such as 2,4-toluene diisocyanate (TDI) or methylenebis-(4-cyclohexyl isocyanate) (HMDI) and a polyol which is cured with a polyamine, such as methylenedianiline (MDA), or a trifunctional glycol, such as trimethylol propane, or tetrafunctional glycol, such as N,N,N', N'-tetrakis(2-hydroxpropyl)ethylenediamine. However, the present invention is not limited to just these specific types of thermoset polyurethanes. Quite to the contrary, any suitable thermoset polyurethane may be employed to form the outer cover layer of the present invention.

The inner cover layer 16 of the present invention is formed from a hard, high flexural modulus, resilient material that contributes to the low spin, distance characteristics of the presently claimed balls when they are struck for long shots (e.g. driver or long irons). Specifically, in one embodiment, the inner cover layer materials have a Shore D hardness of about 60–80, preferably about 69–74 and most preferably about 70–72. Furthermore, as defined herein, the term "high flexural modulus" means a flexural modulus (as measured by ASTM 790) of at least about 60,000 psi, preferably about 70,000 psi to about 120,000 psi and most preferably at least about 75,000 psi. In another embodiment, the inner cover preferably has a hardness of between about 55 and 59 Shore D and a thickness of between about 0.03 and 0.08 inches.

The inner cover layer may be formed from a wide variety of hard, high flexural modulus resilient materials. Among the preferred inner cover materials are hard, high flexural modulus ionomer resins and blends thereof. These ionomers are obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component includes E/X/Y copolymers where E is ethylene, X is a softening comonomer such as acrylate or methacrylate present in 0–50 (preferably 0–25, most preferably 0–20), weight percent of the polymer, and Y is acrylic or methacrylic acid present in 5–35 (preferably at least about 16, more preferably at least about 16–35, most preferably at least about 16–20) weight percent of the polymer, wherein the acid moiety is neutralized 1–90% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which the ionomers are made is well known in the art as described in e.g., U.S. Pat. No. 3,262,272. Such ionomer resins are commercially available from DuPont Co. under the tradename SURLYN® and from Exxon under the tradename Iotek®. Some particularly suitable SURLYNS® include SURLYN® 8140 (Na) and SURLYN® 8546 (Li), which have a methacrylic acid content of about 19%.

However, the materials for the inner cover layer are not limited to ionomer resins. Instead, the present invention contemplates that virtually any hard, high flexural modulus, resilient material that is compatible with the other materials of the golf ball may be employed as the inner cover layer. Examples of other suitable inner cover materials include thermoplastic or thermoset polyurethanes, thermoplastic or thermoset polyetheresters or polyetheramides, thermoplastic or thermoset polyester, a dynamically vulcanized elastomer, a functionalized styrenebutadiene elastomer, a metallocene polymer or blends thereof.

Suitable thermoplastic polyetheresters include materials, which are commercially available from DuPont under the tradename Hytrel®. Suitable thermoplastic polyetheramides include materials, which are available from Elf-Atochem under the tradename Pebax®. Other suitable materials for the inner cover layer include nylon and acrylonitrile-butadiene-styrene copolymer (ABS).

In another embodiment, a multi-layer cover formed by a sandwich injection molding process, wherein said cover comprises three layers: an inner layer and an outer layer of a first material and an intermediate layer therebetween of a second material. As illustrated in FIG. 3, a sandwich cover 26 comprising outer cover layer 28, inner cover layer 30 and intermediate cover layer 32. The sandwich injection molding process for forming a multi-layer golf ball cover includes the steps of pushing a measured amount of a first plasticized material into one end of an accumulation cylinder, pushing a measured amount of a second plasticized material into the opposite end of the accumulation cylinder, and injecting both materials in a single plunging step, so that the first material substantially coats the surface of the mold while the second material substantially fills the interior of the first material. The first plasticized material cools and solidifies when coming into contact with the surface of the mold. When a lesser amount of the first plasticized material and a faster injection rate are used, thinner inner and outer cover layers can be realized. Hence, a thinner mold cavity can be used to produce a thin multi-layer cover in accordance to the present invention is realized. The sandwich injection molding process is fully described in U.S. Pat. No. 5,783,293. The disclosure of the '293 patent is incorporated herein in its entirety. Sandwich injection molding golf ball covers can also be accomplished with other commercially available apparatus known to those of ordinary skill in the art.

In another embodiment, additional suitable cover materials include those disclosed in U.S. Pat. Nos. 6,419,535, 6,152,834 and 5,919,100 and in international publication Nos. WO 00/23519 and WO 00/57962. These references are incorporated by reference in their entireties. Other suitable cover materials include any partially or fully neutralized ionomer, metallocene or other catalyzed polymers, silicone, other thermoplastic and thermoset elastomers and metal salt of a fatty acid and a melt processible composition comprising a highly neutralized ethylene copolymer and one or more aliphatic, mono-functional organic acids having fewer than 36 carbon atoms of salts thereof, wherein greater than 90% of all the acid of the ethylene copolymer is neutralized. The cover may also comprise a single layer. Alternatively, the cover materials may include a compression molded, injection molded, cast or reaction molded composition comprising a thermoplastic or thermosetting polyurethane or polyurethane copolymer.

While various descriptions of the present invention are described above, it is understood that the various features of the present invention can be used singly or in combination thereof. Therefore, this invention is not to be limited to the specifically preferred embodiments depicted therein.

What is claimed is:

1. A golf ball comprising:
   a core having an inner core and an outer core and which is encased by a cover having a thickness from about 0.010 inch to about 0.080 inch, wherein the inner core has a specific gravity of at least about 3, a diameter of about 0.40 inch to about 0.60 inch, and comprises a polymeric matrix comprising polyurethane, polyureas, or a combination thereof, wherein the inner core comprises a polymeric matrix substantially free of polybutadiene.

2. The golf ball of claim 1, wherein the specific gravity of the inner core is from about 3 to about 4.

3. The golf ball of claim 1, wherein the specific gravity of the inner core is about 3.6.

4. The golf ball of claim 1, wherein the inner core comprises a polymeric matrix comprising polyurethane.

5. The golf ball of claim 1, wherein the polymeric matrix further comprises a gravity filler.

6. The golf ball of claim 5, wherein the high specific gravity filler is selected from a group consisting of metal powder, metal alloy powder, metal oxide, metal stearates, particulates and carbonaceous material.

7. The golf ball of claim 5, wherein the high specific gravity filler is selected from a group consisting of bismuth powder, boron powder, brass powder, bronze powder, cobalt powder, copper powder, inconel metal powder, iron metal powder, molybdenum powder, nickel powder, stainless steel powder, titanium metal powder, zirconium oxide powder, aluminum flakes, tungsten metal powder, beryllium metal powder, zinc metal powder, tin metal powder, zinc oxide, iron oxide, aluminum oxide, titanium dioxide, magnesium oxide, zirconium oxide and tungsten trioxide.

8. The golf ball of claim 5, wherein the gravity filler is tungsten powder.

9. The golf ball of claim 1, wherein the diameter of the inner core is from about 0.45 inch to about 0.55 inch.

10. The golf ball of claim 1, wherein the diameter of the inner core is about 0.5 inch.

11. The golf ball of claim 1, wherein the outer core has a specific gravity in the range of about 1.0 to about 1.1.

12. The golf ball of claim 11, wherein the outer core is made of polybutadiene and has a specific gravity of about 1.06.

13. The golf ball of claim 1, wherein the outer core comprises a polymeric matrix substantially free of fillers.

14. The golf ball of claim 13, wherein the filler content in the outer core is less than about 3 phr to 100 phr of polymeric core material.

15. The golf ball of claim 13, wherein the outer core is made of a polymeric matrix selected from a group consisting of natural rubber, polybutadiene, polyisoprene, styrene-butadiene or styrene-propylene-diene rubber, polyamides, polyesters, thermoplastic elastomer, polyether amide copolymers, polyether ester copolymers, thermoplastic urethane, styrenic block copolymers elastomers, metal salt of a fatty acid, partially or fully neutralized ionomer, metallocene or other catalyzed polymer, castable material, urethane, polyurea, epoxy, silicone, interpenetrating polymer networks, and a melt processible composition, which comprises a highly neutralized ethylene copolymer and one or more aliphatic, mono-functional organic acids having fewer than 36 carbon atoms of salts thereof, wherein greater than 90% of all the acid of the ethylene copolymer is neutralized.

16. The golf ball of claim 13, wherein the outer core has a diameter from about 1.45 inch to 1.62 inch.

17. The golf ball of claim 16, wherein the outer core has a diameter from about 1.55 inch to about 1.60 inch.

18. The golf ball of claim 13, wherein the outer core further comprises at least one sulfur compound.

19. The golf ball of claim 18, wherein the sulfur compound is pentachlorothiophenol.

20. The golf ball of claim 18, wherein the sulfur compound is zinc pentachlorothiophenol.

21. The golf ball of claim 1, wherein the cover comprises an inner cover layer and an outer cover layer.

22. The golf ball of claim 21, wherein the inner or outer cover thickness is about 0.01 inch to 0.08 inch.

23. The golf ball of claim 21, wherein the inner cover comprises an ionomer and has a Shore D hardness of greater than about 60.

24. The golf ball of claim 23, wherein the Shore D hardness is from about 69 to about 74.

25. The golf ball of claim 21, wherein the inner cover has a Shore D hardness from about 55 to about 59.

26. The golf ball of claim 21, wherein the outer cover comprises a urethane having a Shore D hardness of less than about 65.

27. The golf ball of claim 26, wherein the urethane has a Shore D hardness of about 30 to about 60.

28. The golf ball of claim 1, wherein the cover comprises a material selected from a group consisting of polyurethane, partially or fully neutralized ionomer, polyurea, polyurethane ionomer, metallocene or other catalyzed polymer, silicone, metal salt of a fatty acid and melt processible composition, which comprises a highly neutralized ethylene copolymer and one or more aliphatic, mono-functional organic acids having fewer than 36 carbon atoms of salts thereof, wherein greater than 90% of all the acid of the ethylene copolymer is neutralized.

29. A golf ball comprising:
a core having an inner core and an outer core and which is encased by a cover having a thickness from about 0.010 inch to about 0.080 inch, wherein the inner core has a specific gravity of at least about 3, a diameter of about 0.40 inch to about 0.60 inch, and comprises a polymeric matrix comprising polyurethane, polyureas, or a combination thereof, wherein the cover is a sandwich cover and wherein the sandwich cover comprises an inner cover layer and outer cover layer comprising a first polymeric material and an intermediate cover layer comprising a second polymeric material.

* * * * *